(12) United States Patent
Fujino (10) Patent No.: US 10,397,418 B1
(45) Date of Patent: Aug. 27, 2019

(54) PROFILE CREATION DEVICE, PROFILE CREATION METHOD, AND RECORDING MEDIUM

(71) Applicant: SEIKO EPSON CORPORATION, Tokyo (JP)

(72) Inventor: Makoto Fujino, Nagano (JP)

(73) Assignee: Seiko Epsom Corporation, Tokyo (JP)

( * ) Notice: Subject to any disclaimer, the term of this patent is extended or adjusted under 35 U.S.C. 154(b) by 0 days.

(21) Appl. No.: 16/278,811

(22) Filed: Feb. 19, 2019

(30) Foreign Application Priority Data

Feb. 21, 2018 (JP) .................................. 2018-028495

(51) Int. Cl.
*H04N 1/00* (2006.01)
*H04N 1/60* (2006.01)
*G01J 3/46* (2006.01)

(52) U.S. Cl.
CPC ............. *H04N 1/00514* (2013.01); *G01J 3/46* (2013.01); *H04N 1/00466* (2013.01); *H04N 1/6022* (2013.01); *H04N 1/6086* (2013.01); *H04N 1/6088* (2013.01); *G01J 2003/467* (2013.01)

(58) Field of Classification Search
CPC ............. H04N 1/00514; H04N 1/6022; H04N 1/00466; H04N 1/6086; H04N 1/6088; G01J 3/46; G01J 2003/467
See application file for complete search history.

(56) References Cited

FOREIGN PATENT DOCUMENTS

| JP | 2011-139213 A | 7/2011 |
|----|---------------|--------|
| JP | 4785676 B2    | 10/2011 |
| JP | 2012-124730 A | 6/2012 |
| JP | 2012-231388 A | 11/2012 |
| JP | 6155644 B2    | 7/2017 |
| JP | 2019-041173 A | 3/2019 |

*Primary Examiner* — Christopher Wait (57) ABSTRACT

The present invention accepts an input of a temporary condition, which is an illumination condition temporarily selected by a user from a plurality of illumination conditions, uses spectral colorimetric data for a specific patch printed as a specific color to calculate a first color value, which is a color value under each of the plurality of illumination conditions, calculates, by using the first color value, a second color value, which is a color value indicating an appearance of a printed matter printed to appear as the specific color under the temporary condition, which is an illumination condition other than the temporary condition, displays color information indicated by the second color value, accepts an input of an illumination condition permanently selected by the user from the plurality of illumination conditions, and creates a profile such that the specific patch is observed as the specific color under the illumination condition permanently selected.

12 Claims, 10 Drawing Sheets

|   | D50 | D65 | F7 | F8 | F9 | F10 | F11 | F12 |
|---|---|---|---|---|---|---|---|---|
| L* | 73.9 | 74.0 | 73.8 | 73.8 | 73.5 | 73.5 | 73.6 | 73.6 |
| a* | -1.2 | -2.0 | -1.6 | -0.9 | 0.1 | 1.8 | 2.3 | 2.6 |
| b* | -2.2 | -1.6 | -2.2 | -2.7 | -3.2 | -2.6 | -2.6 | -2.8 |

# PROFILE CREATION DEVICE, PROFILE CREATION METHOD, AND RECORDING MEDIUM

BACKGROUND

1. Technical Field

The present disclosure relates to profile creation.

2. Related Art

JP-A-2012-231388 discloses a method for editing a profile. A profile refers to a color conversion table. In this method, a user performs editing work through an editing screen displayed on a computer display. In the editing screen, pre-edit and post-edit color areas are displayed.

In the above-described related art, color inconstancy is not considered. Color inconstancy refers to a phenomenon in which color appearances differ in a case where a printed matter is observed under different illumination conditions. Considering the above-described phenomenon, the present disclosure addresses the problem of making it possible for a user to grasp the effect of color inconstancy when creating a profile, without actually printing and observing a printed matter under different illumination conditions.

SUMMARY

One aspect of the present disclosure is a profile creation device including a temporary selection unit configured to accept an input of a temporary condition, which is an illumination condition temporarily selected by a user from a plurality of illumination conditions, a first calculation unit configured to use spectral colorimetric data for a specific patch printed as a specific color to calculate a color value under each of the plurality of illumination conditions, a second calculation unit configured to calculate, by using the color value calculated by the first calculation unit, a color value indicating an appearance of a printed matter printed to appear as the specific color under the temporary condition in a case where it is assumed that the printed matter is observed under a comparison condition, which is an illumination condition other than the temporary condition, a display unit configured to display color information indicated by the color value calculated by the second calculation unit, a permanent selection unit configured to accept an input of an illumination condition permanently selected by the user from the plurality of illumination conditions, and a creation unit configured to create a profile such that the specific patch is observed as the specific color under the illumination condition permanently selected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
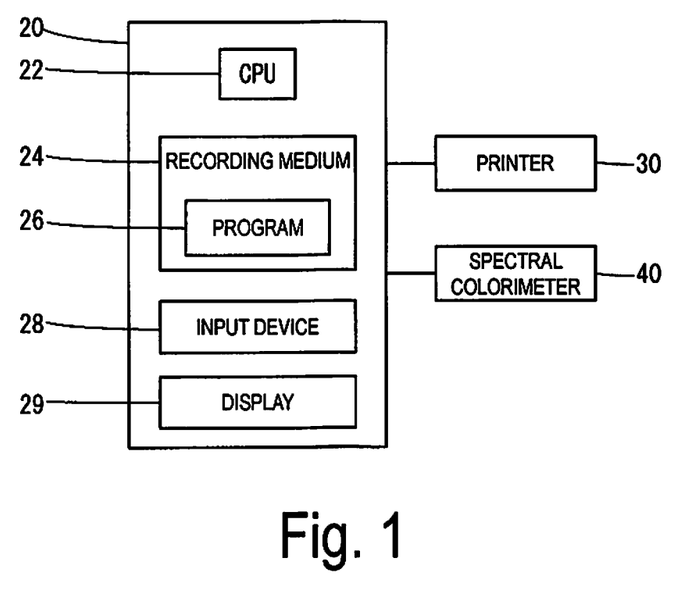
FIG. 1 illustrates a profile creation device, a printer, and a spectral colorimeter.

FIG. 1 illustrates a profile creation device 20, a printer 30, and a spectral colorimeter 40. In order to perform printing, a profile in the present exemplary embodiment is used for color conversion from a device dependent color represented by an RGB value or a CMYK value to a device independent color represented by an L*a*b* value, or color conversion in an opposite direction thereto.

The profile creation device 20 is a computer. The profile creation device 20 includes a CPU 22, a recording medium 24, an input device 28, and a display 29. A program 26 is recorded on the recording medium 24. The program 26 is a program for realizing profile creation processing, which will be described later. The input device 28 includes a keyboard, a mouse, and the like. The display 29 displays a screen in accordance with the control of the CPU 22.

The printer 30 is communicatively connected to the profile creation device 20. The printer 30 performs printing in response to a printing instruction input from the profile creation device 20.

The spectral colorimeter 40 is communicatively connected to the profile creation device 20. The spectral colorimeter 40 obtains the reflectance of an object to be measured for each wavelength, and inputs an obtained result to the profile creation device 20.

Figure 2:
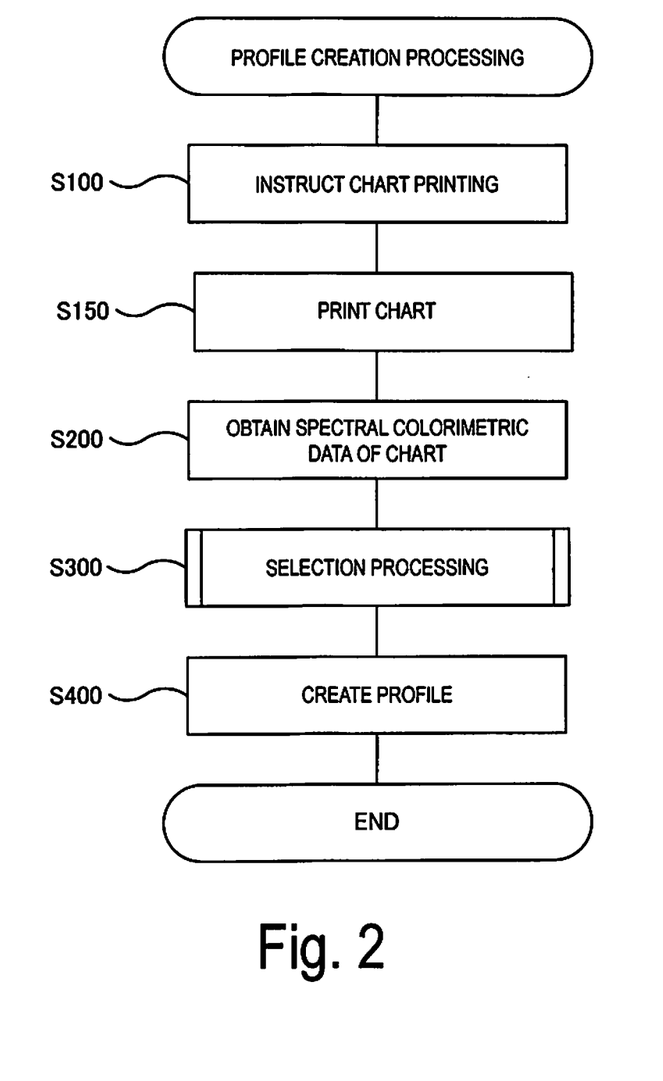
FIG. 2 is a flowchart illustrating profile creation processing.

FIG. 2 is a flowchart illustrating the profile creation processing. First, the CPU 22 inputs a printing instruction for a profile creation chart (hereinafter referred to simply as a "chart") to the printer 30 (S100). The printer 30 prints the chart in accordance with the printing instruction (S150). The chart includes a plurality of patches on which different colors have been printed.

Next, the spectral colorimeter 40 obtains the spectral colorimetric data of the chart (S200). The obtained spectral colorimetric data is input to the profile creation device 20.

Figure 3:
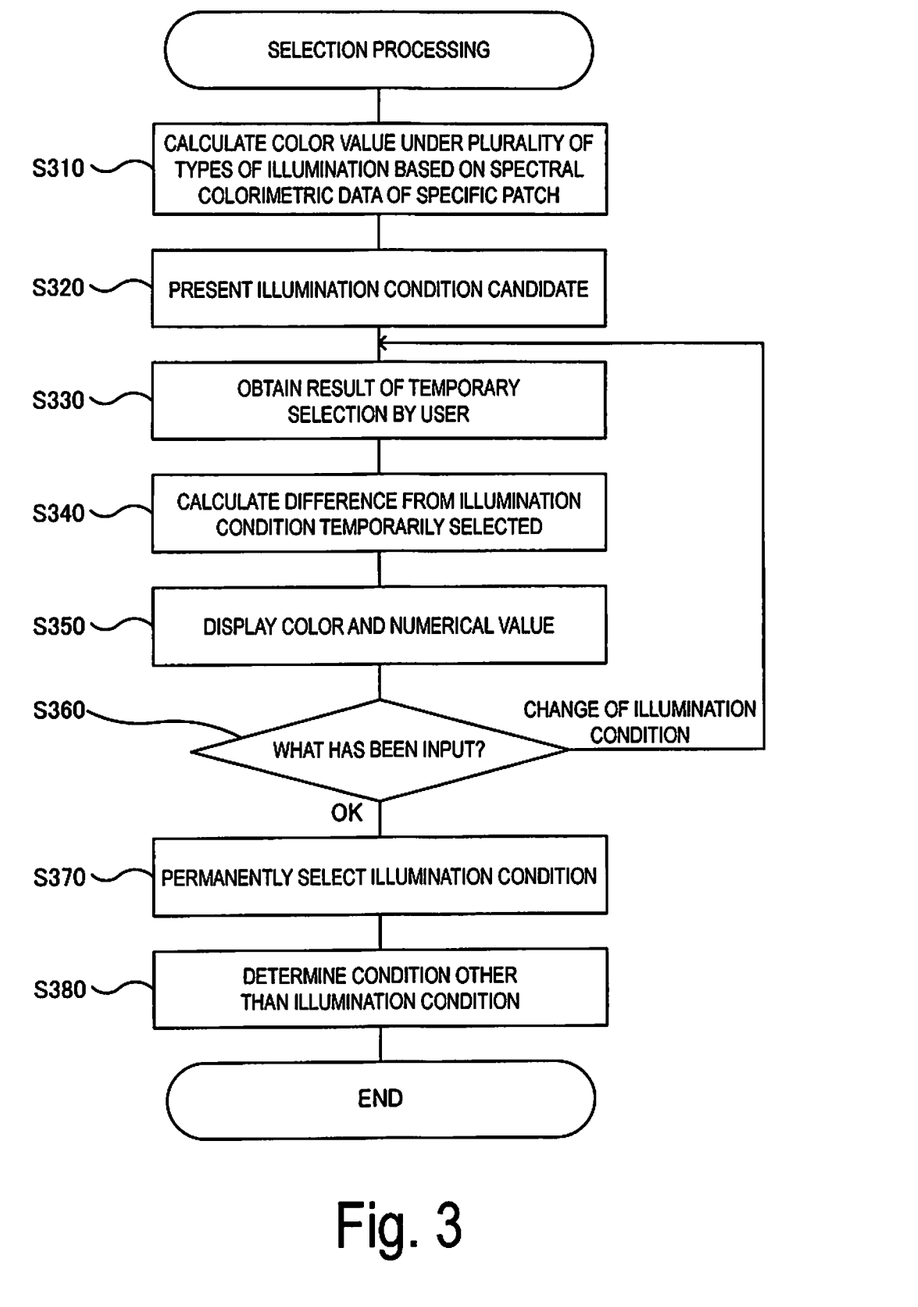
FIG. 3 is a flowchart illustrating selection processing.

Next, the CPU 22 performs selection processing (S300). FIG. 3 is a flowchart illustrating the selection processing. First, the CPU 22 uses spectral colorimetric data for a specific patch to calculate color values under a plurality of types of illumination conditions, which will be described later (S310). In the present exemplary embodiment, the specific patch is a patch printed as a specific color. The specific color in the present exemplary embodiment is an achromatic color. In the present exemplary embodiment, the lightness of the specific color is predetermined. The CPU 22 determines the specific patch based on spectral colorimetric data for each of the plurality of patches.

Figure 4:
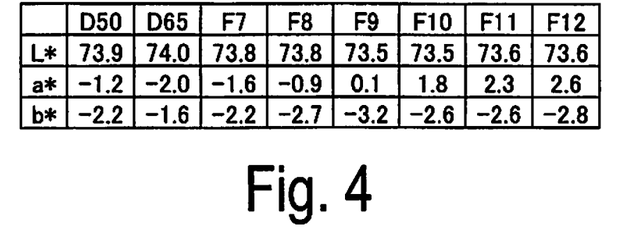
FIG. 4 is a table illustrating an example of a color value calculation result for a specific patch.

FIG. 4 is a table illustrating an example of a color value calculation result for the specific patch. In the present exemplary embodiment, eight types of illumination conditions, i.e., D50, D65, F7, F8, F9, F10, F11, and F12 are provided. D65 refers to the CIE standard light source D65.

CIE is an acronym for Commission Internationale de l'Eclairage, which means the International Commission on Illumination. D50 is also a light source defined as being included in the D series of the CIE standard light sources. F7 to F12 are illumination conditions defined by the JIS standard Z8719 or the CIE. Since an intensity for each wavelength has been defined for each illumination condition, it is possible to calculate each value of L*, a*, and b* by using spectral colorimetric data.

Note that, as illustrated in FIG. 4, a* and b* are not zero under any of the illumination conditions. Thus, the specific patch printed in S150 does not appear in an achromatic color under any of the above-described eight types of illumination conditions.

Figure 5:
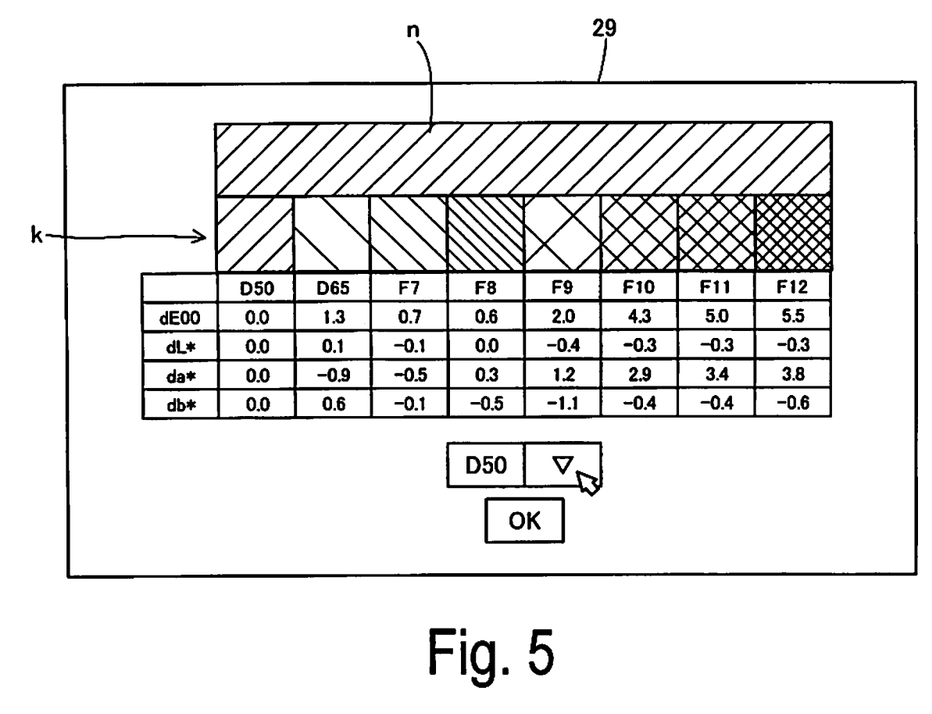
FIG. 5 illustrates a preview screen in a case where D50 is temporarily selected.

Next, the CPU 22 presents illumination condition candidates to a user (S320). FIG. 5 illustrates an example of a preview screen displayed on the display 29. The numerical values and hatching illustrated in FIG. 5 are determined in the steps described later, and thus will be described in order. As a presentation of the illumination condition candidates, which is performed in S320, the above-described eight types of illumination conditions are displayed in characters.

Next, the CPU 22 obtains the result of temporary selection performed by the user (S330). The user can select an illumination condition from a pull-down menu by operating a pointer on the screen using the input device 28. In the example illustrated in FIG. 5, D50 is temporarily selected.

Next, the CPU 22 calculates the difference between each color value calculated in S310 and a color value under the illumination condition temporarily selected (S340). Specifically, the calculation of dE00, and the calculation of the difference between each value of L*, a*, and b* and a corresponding value under the illumination condition temporarily selected are performed. dE00 refers to CIEDE2000 or delta E00, and indicates a color difference.

Next, the CPU 22 uses the values calculated in S340 to display an appearance under each illumination condition with a color and numerical values (S350).

As illustrated in FIG. 5, in the preview screen, areas k are arranged above characters indicating eight types of illumination conditions such as D50. The hatching indicated in each of the areas k is an area for simulating a color appearance under each of the illumination conditions. In FIG. 5, for the convenience of illustration, color differences are represented by different types of hatching, not by actual colors. a* and b* of the colors illustrated in the areas k are the values indicating the differences calculated in S340. For L* of the colors illustrated in the areas k, the values calculated in S310 are used as they are.

In the example illustrated in FIG. 5, D50 is temporarily selected. Thus, the values of a* and b* of the color displayed in the area corresponding to D50 among the areas k are zero. That is, the color displayed in the area corresponding to D50 is an achromatic color. Meanwhile, the values of a* and b* of the colors displayed in the areas corresponding to the illumination conditions other than D50 among the areas k are not zero, and thus the colors are not an achromatic color. That is, the colors displayed in the areas corresponding to the illumination conditions other than D50 simulate appearances of a printed matter printed to appear in an achromatic color under the illumination condition of D50 in a case where it is assumed that the printed matter is placed under different illumination conditions.

A comparison area n is an area for simulating a color appearance under an illumination condition temporarily selected. In FIG. 5, in the comparison area n, the same color as that of the area corresponding to D50 is displayed. The comparison area n is in contact with the entirety of the areas k, i.e., the areas corresponding to the eight types of illumination conditions. Thus, the user can easily compare an appearance under an illumination condition temporarily selected with appearances under the other illumination conditions.

As illustrated in FIG. 5, as a color value difference, each value of dE00, dL*, da*, and db* is displayed. Each value of dL*, da*, and db* is a difference from each value of L*, a*, and b*. In the screen illustrated in FIG. 5, the user can grasp, with numerical values, a color difference or a difference of each value in the Lab color space.

In the present exemplary embodiment, the colors indicated in the areas k, the color indicated in the comparison area n, and the numerical values of dE00, dL*, da*, and db* are collectively referred to as color information.

Next, the CPU 22 waits for an instruction input by the user, and determines whether the instruction is "OK" or "change of illumination condition" (S360). In a case where the instruction is the change of illumination condition (S360, change of illumination condition), the CPU 22 returns to S330, and performs S340 and S350 by using a changed illumination condition.

Figure 6:
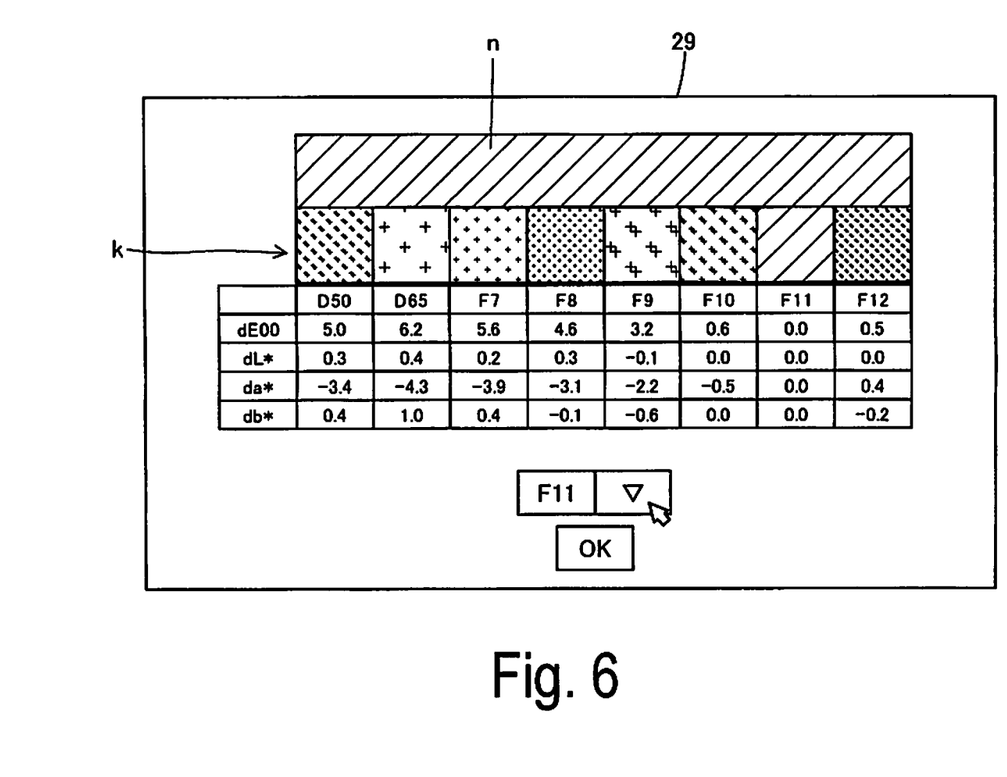
FIG. 6 illustrates a preview screen in a case where F11 is temporarily selected.

FIG. 6 illustrates a preview screen in a case where F11 is temporarily selected as an illumination condition. In the example illustrated in FIG. 6, since F11 is temporarily selected, an achromatic color is displayed in an area corresponding to F11 among the areas k. Areas corresponding to the other illumination conditions among the areas k simulate appearances of a printed matter printed to appear in an achromatic color under the illumination condition of F11 in a case where it is assumed that the printed matter is placed under different illumination conditions. All of the values indicating differences from color values corresponding to F11 are zero. For the other illumination conditions, differences from the color values corresponding to F11 are displayed.

Meanwhile, in a case where the instruction "OK" is input, the CPU 22 permanently selects, as a profile creation condition, an illumination condition that had been temporarily selected at the time the instruction "OK" was input (S370). Next, the CPU 22 accepts an input of a condition other than the illumination condition from the user, determines the input condition as another profile creation condition (S380), and finishes the selection processing. The condition other than the illumination condition is, for example, a K usage property. The K usage property will be described in Exemplary Embodiment 3.

After finishing the selection processing, as illustrated in FIG. 2, the CPU 22 creates a profile (S400) and finishes the profile creation processing. The CPU 22 records the created profile on the recording medium 24. The condition determined in the selection processing is used in S400. That is, the profile is created such that the specific patch appears in an achromatic color under the illumination condition permanently selected. Under each of the above-described eight types of illumination conditions, the specific patch printed by using the created profile is observed as a color that had been displayed when the illumination condition was permanently selected.

According to the present exemplary embodiment, the user can grasp the effect of color inconstancy before printing. Thus, it is possible to save the effort of actually performing printing to check the effect of color inconstancy.

Exemplary Embodiment 2 will be described. Description of Exemplary Embodiment 2 is mainly directed to differences from Exemplary Embodiment 1. Contents not described are the same as the corresponding contents of Exemplary Embodiment 1. Note that Exemplary Embodiment 3 described later and the subsequent exemplary embodiments will be described in the same manner.

Figure 7:
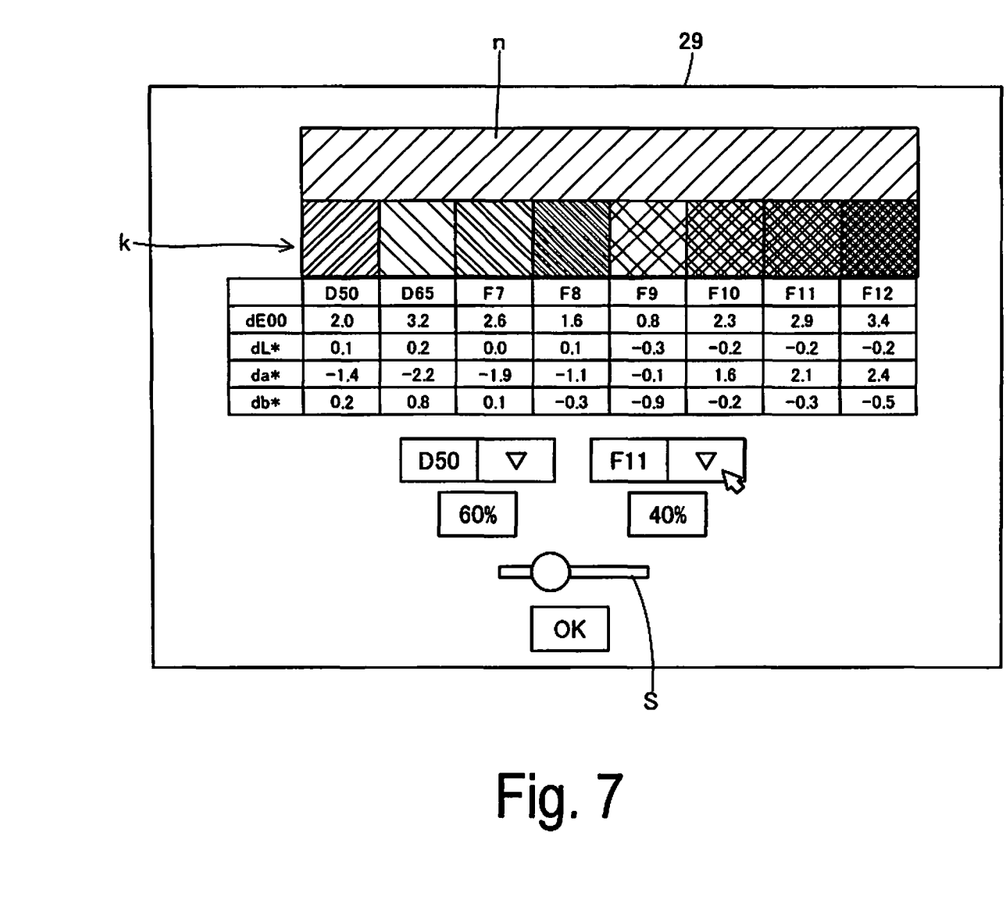
FIG. 7 illustrates an example of a preview screen according to the present exemplary embodiment.

FIG. 7 illustrates an example of a preview screen according to the present exemplary embodiment. As illustrated in FIG. 7, in the present exemplary embodiment, two types of illumination conditions can be selected. In addition, in the present exemplary embodiment, the user can input intensity ratios of the two types of illumination conditions selected. The inputs of the intensity ratios are achieved by operating a slider S on the screen. In the example illustrated in FIG. 7, D50 and F11 are selected, and the intensity ratio of D50 is input as 60% and the intensity ratio of F11 is input as 40%.

The change of intensity ratios corresponds to the "change of illumination condition" in S360 of the selection processing illustrated in FIG. 3. Thus, in a case where the intensity ratios are changed, the CPU 22 performs S330 to S350 and updates the preview screen.

According to the present exemplary embodiment, the user can grasp the effect of color inconstancy for the two types of illumination conditions. In addition, since it is possible to arbitrarily set the intensity ratios of the two types of illumination conditions, the user can grasp the effect of the intensity ratios of the two types of illumination conditions on color inconstancy.

Figure 8:
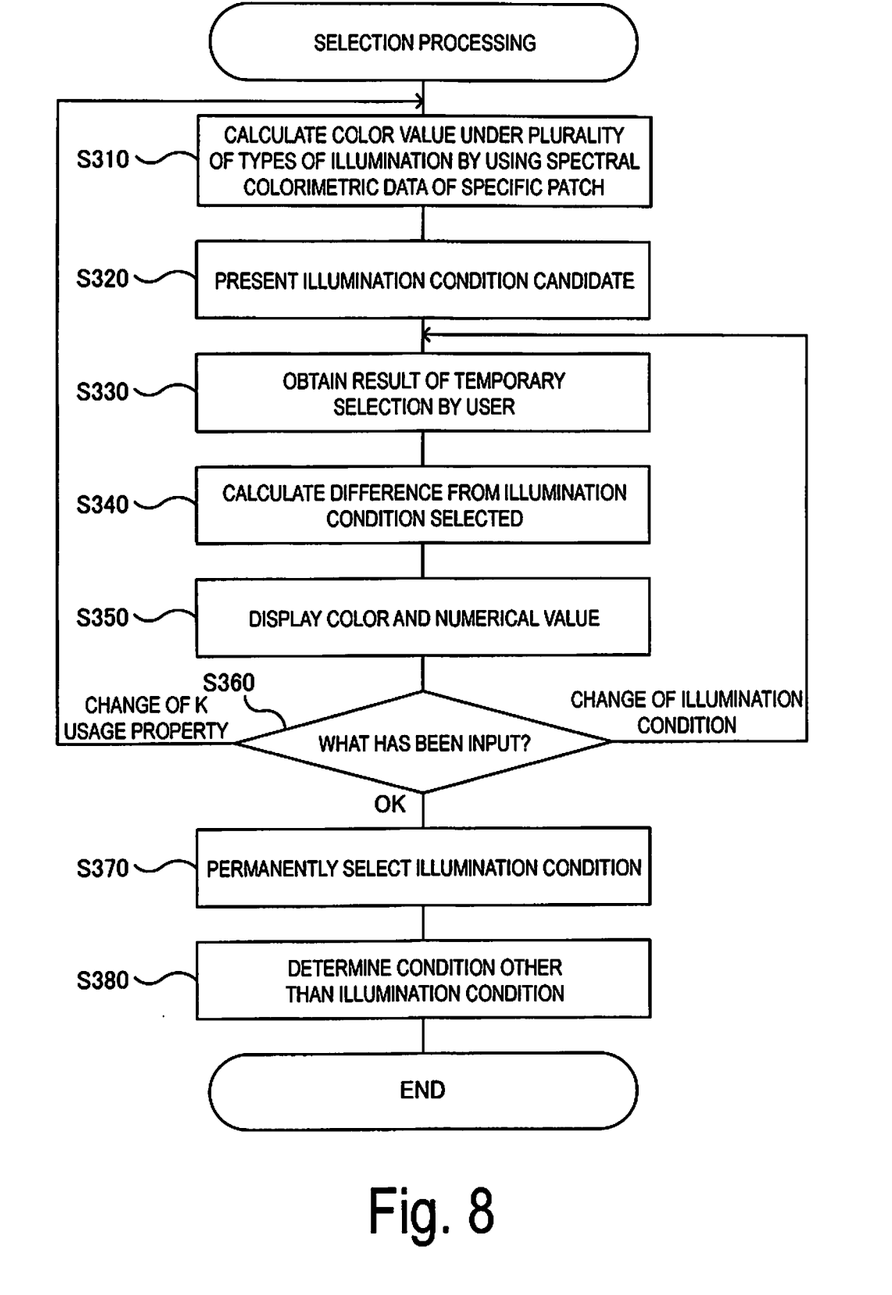
FIG. 8 is a flowchart illustrating selection processing according to the present exemplary embodiment.
Figure 9:
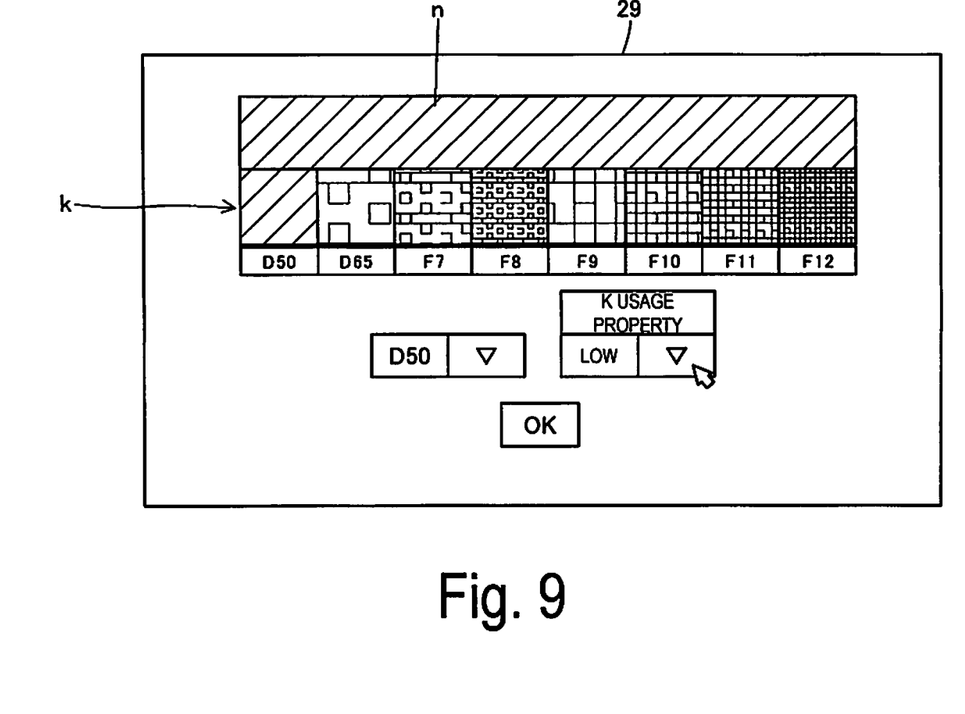
FIG. 9 illustrates an example of a preview screen according to the present exemplary embodiment.

Exemplary Embodiment 3 will be described. FIG. 8 is a flowchart illustrating selection processing according to the present exemplary embodiment. FIG. 9 illustrates an example of a preview screen according to the present exemplary embodiment.

In the present exemplary embodiment, the user can input a degree of the K usage property in addition to an illumination condition. The K usage property is an index for indicating a set degree of a K ink amount with respect to a composite black ink amount when an achromatic color is printed in a case where there are four colors of CMYK (cyan, magenta, yellow, and black) as ink colors, for example. The composite black is a printing method for representing an achromatic color by mixing the three ink colors of CMY.

In the present exemplary embodiment, five levels are provided for the K usage property. Specifically, "lowest", "low", "medium", "high", or "highest" can be selected. Generally, when the K usage property is changed, an appearance under each illumination condition changes. Specifically, there is a tendency that, when the K ink amount becomes larger, the change in color appearance due to the change of illumination condition becomes smaller, but graininess is deteriorated. Thus, it is preferable to make the K usage property lower within a range in which the change in color appearance is acceptable.

In a case where the K usage property is changed (S360, change of K usage property), the CPU 22 returns to S310 and performs color value calculation again. Note that, since the default value of the K usage property is "medium", in the first S310, "medium" is used as the K usage property.

According to the present exemplary embodiment, the user can grasp the effect of the change of the K usage property on color inconstancy.

Figure 10:
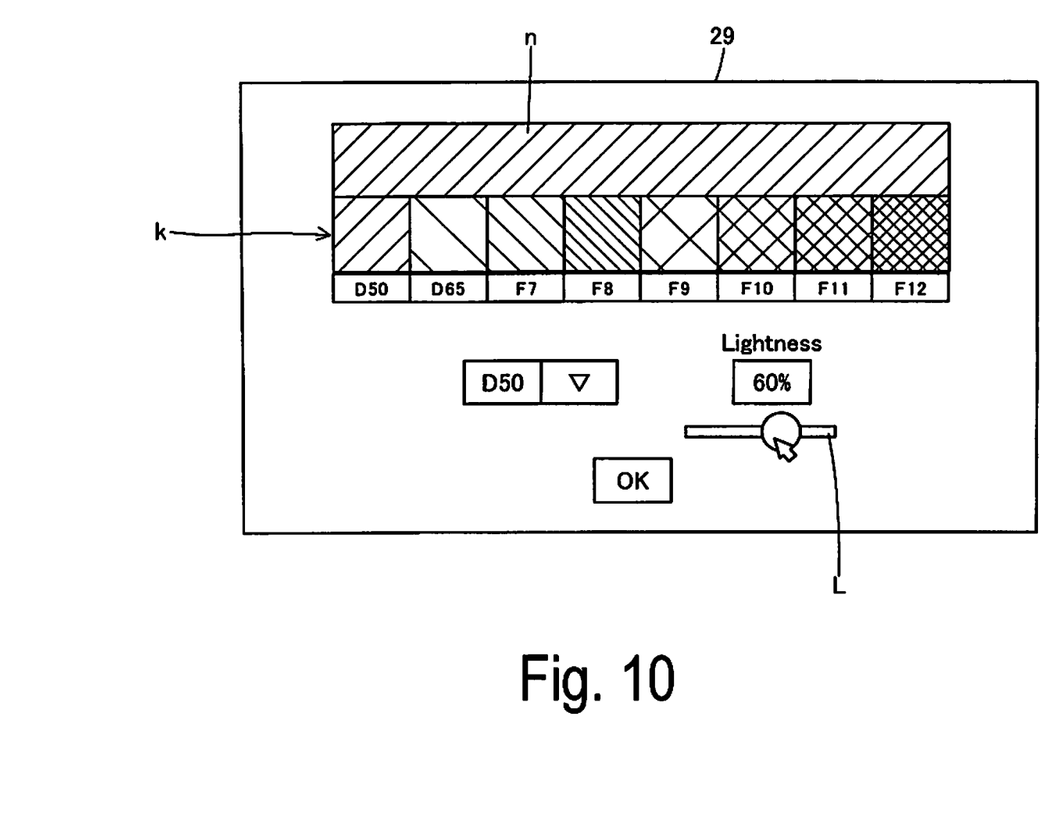
FIG. 10 illustrates an example of a preview screen according to the present exemplary embodiment.

Exemplary Embodiment 4 will be described. FIG. 10 illustrates an example of a preview screen according to the present exemplary embodiment. In the present exemplary embodiment, a user can input the lightness of an achromatic color as a specific color. Specifically, by operating a slider B on the screen, it is possible to arbitrarily set the lightness within a range from 0% to 100%.

The change of the lightness corresponds to the "change of illumination condition" in S360 of the selection processing illustrated in FIG. 3. Thus, in a case where the lightness is changed, the CPU 22 performs S330 to S350 and updates the preview screen.

According to the present exemplary embodiment, the user can grasp the effect of the change of the lightness on color inconstancy.

Figure 11:
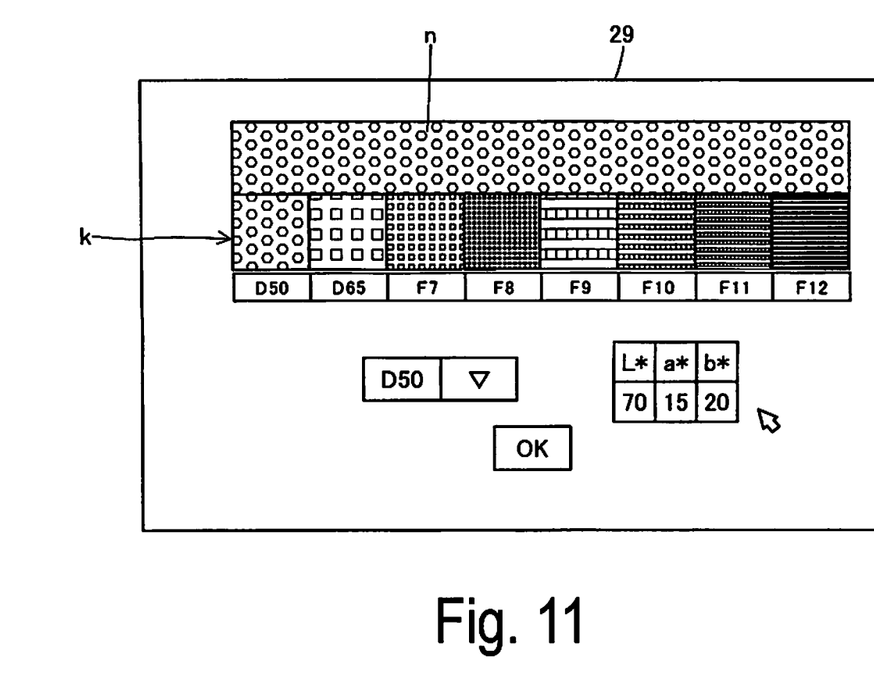
FIG. 11 illustrates an example of a preview screen according to the present exemplary embodiment.

Exemplary Embodiment 5 will be described. FIG. 11 illustrates an example of a preview screen according to the present exemplary embodiment. In the present exemplary embodiment, a user can specify a specific color. Specifically, by the user specifying a desired value for each value of $L^*$, $a^*$, and $b^*$ on the screen, it is possible to specify an arbitrary color including a chromatic color as the specific color. Note that $(L^*, a^*, b^*)=(70, 15, 20)$ indicated in FIG. 11 represents a typical skin color.

In a case where the specific color is changed (S360, change of specific color), the CPU 22 returns to S310, and performs specific patch selection and color value calculation again.

According to the present exemplary embodiment, the user can grasp the effect of color inconstancy for an arbitrary color.

The present disclosure is not limited to the exemplary embodiments described herein, but may be implemented in various configurations without departing from the spirit of the present disclosure. For example, appropriate replacements or combinations may be made to the technical features in the exemplary embodiments which correspond to the technical features in the aspect described in the SUMMARY to solve some or all of the problems described above or to achieve some or all of the advantageous effects described above. Any of the technical features may be deleted as appropriate unless the technical feature is described herein as indispensable. For example, the following embodiments can be exemplified.

In any of the exemplary embodiments, only a color, only numerical values, or both of the color and the numerical values may be displayed as color information.

A chart standardized by the ECI2002, the ISO12642, and the like, or a customized chart may be used. The ECI2002 is a chart defined by the European Color Initiative.

In a case where a plurality of illumination conditions can be selected as in Exemplary Embodiment 2, the selection of three or more types, not limited to two types, may be made.

In a case where a plurality of illumination conditions can be selected, the intensity ratios of the illumination conditions may be predetermined such that the user cannot make any changes. For example, in a case of two types, each of the intensity ratios may be determined as 50%.

The illumination conditions are not limited to the eight types exemplified in the exemplary embodiments, and arbitrary illumination conditions may be used. For example, at least one of F1 to F6 may be used.

In the above-described exemplary embodiments, a part or all of the functions and processing implemented by software may be implemented by hardware. Furthermore, a part or all of the functions and processing implemented by hardware may be implemented by software. The hardware may be, for example, any of various circuits such as an integrated circuit, a discrete circuit, or a circuit module with a combination of integrated circuits or discrete circuits.

One aspect of the present disclosure may be a profile creation device including a temporary selection unit configured to accept an input of a temporary condition, which is an illumination condition temporarily selected by a user from a plurality of illumination conditions, a first calculation unit configured to use spectral colorimetric data for a specific patch printed as a specific color to calculate a color value under each of the plurality of illumination conditions, a second calculation unit configured to calculate, by using the color value calculated by the first calculation unit, a color value indicating an appearance of a printed matter printed to appear as the specific color under the temporary condition in a case where it is assumed that the printed matter is observed under a comparison condition, which is an illumination condition other than the temporary condition, a display unit configured to display color information indicated by the color value calculated by the second calculation unit, a permanent selection unit configured to accept an input of an illumination condition permanently selected by the user from the plurality of illumination conditions, and a creation unit configured to create a profile such that the specific patch is observed as the specific color under the illumination condition permanently selected. According to this aspect, the user can grasp the effect of color inconstancy by checking the color information displayed by the display unit without actually printing and observing the printed matter under different illumination conditions.

In the above-described aspect, the profile is for determining amounts of a plurality of colors of inks including a black ink, the temporary selection unit accepts an input of a property for an amount of usage of the black ink from the user, and the first calculation unit uses the property input to calculate the color value. According to this aspect, the user can grasp the effect of color inconstancy for an amount of usage of the black ink.

In the above-described aspect, the display unit may display a color as the color information. According to this aspect, the user can grasp the effect of color inconstancy by the color.

In the above-described aspect, the display unit may display, as the color information, a difference between a color value indicating an appearance under the temporary condition and a color value indicating an appearance under the comparison condition with a numerical value. According to this aspect, the user can grasp the effect of color inconstancy by the numerical value.

In the above-described aspect, in a case where the temporary selection unit accepts a change of the temporary condition from the user before the permanent selection is performed, the second calculation unit may use a changed temporary condition to update the color value. According to this aspect, in a case where the illumination condition temporarily selected is changed, the user can grasp the effect of color inconstancy after the change.

In the above-described aspect, the temporary selection unit may accept at least two illumination conditions among the plurality of illumination conditions as an input of the temporary condition, and the second calculation unit may calculate a color value indicating an appearance of a printed matter printed to appear as the specific color under the at least two temporary conditions input in a case where it is assumed that the printed matter is observed under each of the plurality of illumination conditions. According to this aspect, the user can grasp the effect of color inconstancy for the plurality of illumination conditions.

In the above-described aspect, the temporary selection unit may accept inputs of intensity ratios of the at least two illumination conditions, the inputs of which have been accepted, and the second calculation unit may calculate the color value according to the intensity ratios input. According to this aspect, it is possible to grasp the effect of the intensity ratios of the plurality of illumination conditions on color inconstancy.

In the above-described aspect, the specific color may be an achromatic color. An achromatic color is easily affected by color inconstancy. According to this aspect, the user can grasp the effect of color inconstancy for a color easily affected by color inconstancy without any knowledge about color inconstancy.

In the above-described aspect, a lightness setting unit configured to accept setting of a lightness of the specific color from the user may also be included. According to this aspect, the user can grasp the effect of color inconstancy for a specific color having an arbitrary lightness.

In the above-described aspect, a specific color setting unit configured to accept setting of the specific color from the user may also be included. According to this aspect, the user can grasp the effect of color inconstancy for an arbitrary color.

The present disclosure may be implemented in various forms other than the embodiments described above. For example, the present disclosure may be realized in aspects such as of a profile creation method, a program for realizing the method, or a non-transitory executable storage medium for storing the program.

This application claims priority under 35 U.S.C. § 119 to Japanese Patent Application No. 2018-028495, filed Feb. 21, 2018. The entire disclosure of Japanese Patent Application No. 2018-028495 is hereby incorporated herein by reference.

What is claimed is:

1. A profile creation device comprising:
a temporary selection unit configured to accept an input of a temporary condition, which is an illumination condition temporarily selected by a user from a plurality of illumination conditions;
a first calculation unit configured to use spectral colorimetric data for a specific patch printed as a specific color to calculate a color value under each of the plurality of illumination conditions;
a second calculation unit configured to calculate, by using the color value calculated by the first calculation unit, a color value indicating an appearance of a printed matter printed to appear as the specific color under the temporary condition in a case where it is assumed that the printed matter is observed under a comparison condition, which is an illumination condition other than the temporary condition;
a display unit configured to display color information indicated by the color value calculated by the second calculation unit;
a permanent selection unit configured to accept an input of an illumination condition permanently selected by the user from the plurality of illumination conditions; and
a creation unit configured to create a profile such that the specific patch is observed as the specific color under the illumination condition permanently selected.

2. The profile creation device according to claim 1, wherein
the profile is for determining amounts of a plurality of colors of inks including a black ink,
the temporary selection unit accepts an input of a property for an amount of usage of the black ink from the user, and
the first calculation unit uses the property input to calculate the color value.

3. The profile creation device according to claim 1, wherein
the display unit displays a color as the color information.

4. The profile creation device according to claim 1, wherein
the display unit displays, as the color information, a difference between a color value indicating an appearance under the temporary condition and a color value indicating an appearance under the comparison condition with a numerical value.

5. The profile creation device according to claim 1, wherein
in a case where the temporary selection unit accepts a change of the temporary condition from the user before the permanent selection is performed, the second calculation unit uses a changed temporary condition to update the color value.

6. The profile creation device according to claim 1, wherein
the temporary selection unit accepts at least two illumination conditions among the plurality of illumination conditions as an input of the temporary condition, and
the second calculation unit calculates a color value indicating an appearance of a printed matter printed to appear as the specific color under the at least two temporary conditions input in a case where it is assumed that the printed matter is observed under each of the plurality of illumination conditions.

7. The profile creation device according to claim 1, wherein
the temporary selection unit accepts, as an input of the temporary condition, at least two illumination conditions among the plurality of illumination conditions,
the second calculation unit calculates a color value indicating an appearance of a printed matter printed to appear as the specific color under the at least two temporary conditions input in a case where it is assumed that the printed matter is observed under each of the plurality of illumination conditions,
the temporary selection unit accepts inputs of intensity ratios of the at least two illumination conditions, the inputs of which have been accepted, and
the second calculation unit calculates the color value according to the intensity ratios input.

8. The profile creation device according to claim 1, wherein
the specific color is an achromatic color.

9. The profile creation device according to claim 1, further comprising a lightness setting unit configured to accept setting of a lightness of the specific color from the user.

10. The profile creation device according to claim 1, further comprising a specific color setting unit configured to accept setting of the specific color from the user.

11. A profile creation method comprising:
accepting an input of a temporary condition, which is an illumination condition temporarily selected by a user from a plurality of illumination conditions;
using spectral colorimetric data for a specific patch printed as a specific color to calculate a first color value, which is a color value under each of the plurality of illumination conditions;
calculating, by using the first color value, a second color value, which is a color value indicating an appearance of a printed matter printed to appear as the specific color under the temporary condition in a case where it is assumed that the printed matter is observed under a comparison condition, which is an illumination condition other than the temporary condition;
displaying color information indicated by the second color value;
accepting an input of an illumination condition permanently selected by the user from the plurality of illumination conditions; and
creating a profile such that the specific patch is observed as the specific color under the illumination condition permanently selected.

12. A recording medium storing a program for causing a computer to perform:
accepting an input of a temporary condition, which is an illumination condition temporarily selected by a user from a plurality of illumination conditions;
using spectral colorimetric data for a specific patch printed as a specific color to calculate a first color value, which is a color value under each of the plurality of illumination conditions;
calculating, by using the first color value, a second color value, which is a color value indicating an appearance of a printed matter printed to appear as the specific color under the temporary condition in a case where it is assumed that the printed matter is observed under a comparison condition, which is an illumination condition other than the temporary condition;
displaying color information indicated by the second color value;
accepting an input of an illumination condition permanently selected by the user from the plurality of illumination conditions; and
creating a profile such that the specific patch is observed as the specific color under the illumination condition permanently selected.

* * * * *

UNITED STATES PATENT AND TRADEMARK OFFICE
CERTIFICATE OF CORRECTION

PATENT NO. : 10,397,418 B1
APPLICATION NO. : 16/278811
DATED : August 27, 2019
INVENTOR(S) : Makoto Fujino Page 1 of 1

It is certified that error appears in the above-identified patent and that said Letters Patent is hereby corrected as shown below:

On the Title Page

Item [65], insert:
-- US 2019/0260890 A1 Aug. 22, 2019 --

Signed and Sealed this
Twenty-second Day of October, 2019

Andrei Iancu
*Director of the United States Patent and Trademark Office*